US007690600B2

(12) United States Patent
Olive et al.

(10) Patent No.: US 7,690,600 B2
(45) Date of Patent: Apr. 6, 2010

(54) AERIALLY TRANSPORTABLE TANK FOR STORING A COMPOSITION FOR DISCHARGING IN FLIGHT

(75) Inventors: Richard Olive, Martigues (FR); Marc Denante, Marseilles (FR)

(73) Assignee: Eurocopter, Marignane (FR)

( * ) Notice: Subject to any disclaimer, the term of this patent is extended or adjusted under 35 U.S.C. 154(b) by 236 days.

(21) Appl. No.: 11/637,917

(22) Filed: Dec. 13, 2006

(65) Prior Publication Data

US 2007/0164162 A1 Jul. 19, 2007

(30) Foreign Application Priority Data

Dec. 14, 2005 (FR) ................................. 05 12706

(51) Int. Cl.
*B64D 1/16* (2006.01)
(52) U.S. Cl. ..................................................... 244/136
(58) Field of Classification Search ............... 244/1 R, 244/136, 137.1, 135 B; 219/201; 392/478; 239/171, 327, 328; 169/30, 53, 54; 60/39.094; 222/92, 94, 95, 96, 105, 106, 130, 608, 609, 222/500; 220/562, 564, 666, 723, 1.6, 4.12, 220/4.13
See application file for complete search history.

(56) References Cited

U.S. PATENT DOCUMENTS 2,254,157 A * 8/1941 Shaw ......................... 138/103
2,895,693 A * 7/1959 Portias ....................... 244/136
2,991,815 A    7/1961 Pfeiffer
3,488,021 A * 1/1970 Renshaw ................. 244/137.1
3,592,360 A * 7/1971 Aleck .......................... 222/95
3,603,506 A    9/1971 Hubbs
3,661,211 A    5/1972 Powers
3,901,467 A * 8/1975 Hawkshaw ................ 244/136
4,557,400 A * 12/1985 Clarke ........................ 222/105
4,653,706 A * 3/1987 Ragiab ................... 244/110 E
4,875,596 A * 10/1989 Lohse ......................... 220/1.6
5,451,016 A * 9/1995 Foy et al. .................... 244/136
5,474,210 A * 12/1995 Boyd ............................ 222/1
5,690,466 A * 11/1997 Gaddis et al. ............... 414/526
5,897,012 A * 4/1999 Sortwell ..................... 220/4.28
6,264,273 B1 * 7/2001 Waters, Sr. ............. 297/188.14
6,726,052 B1 * 4/2004 Miller ......................... 220/666
2002/0084383 A1 * 7/2002 Maeda ........................ 244/136
2006/0260826 A1 * 11/2006 Hutter et al. .................. 169/51

* cited by examiner

*Primary Examiner*—Tien Dinh
(74) *Attorney, Agent, or Firm*—Young & Thompson

(57) ABSTRACT

An aerially transportable tank (20) for storing a composition for discharging in flight, the tank including a neck (23) terminated by a composition discharge opening (24), and having a wall (21) extending the neck that is sufficiently deformable to be received in part or in full within the neck.

20 Claims, 6 Drawing Sheets

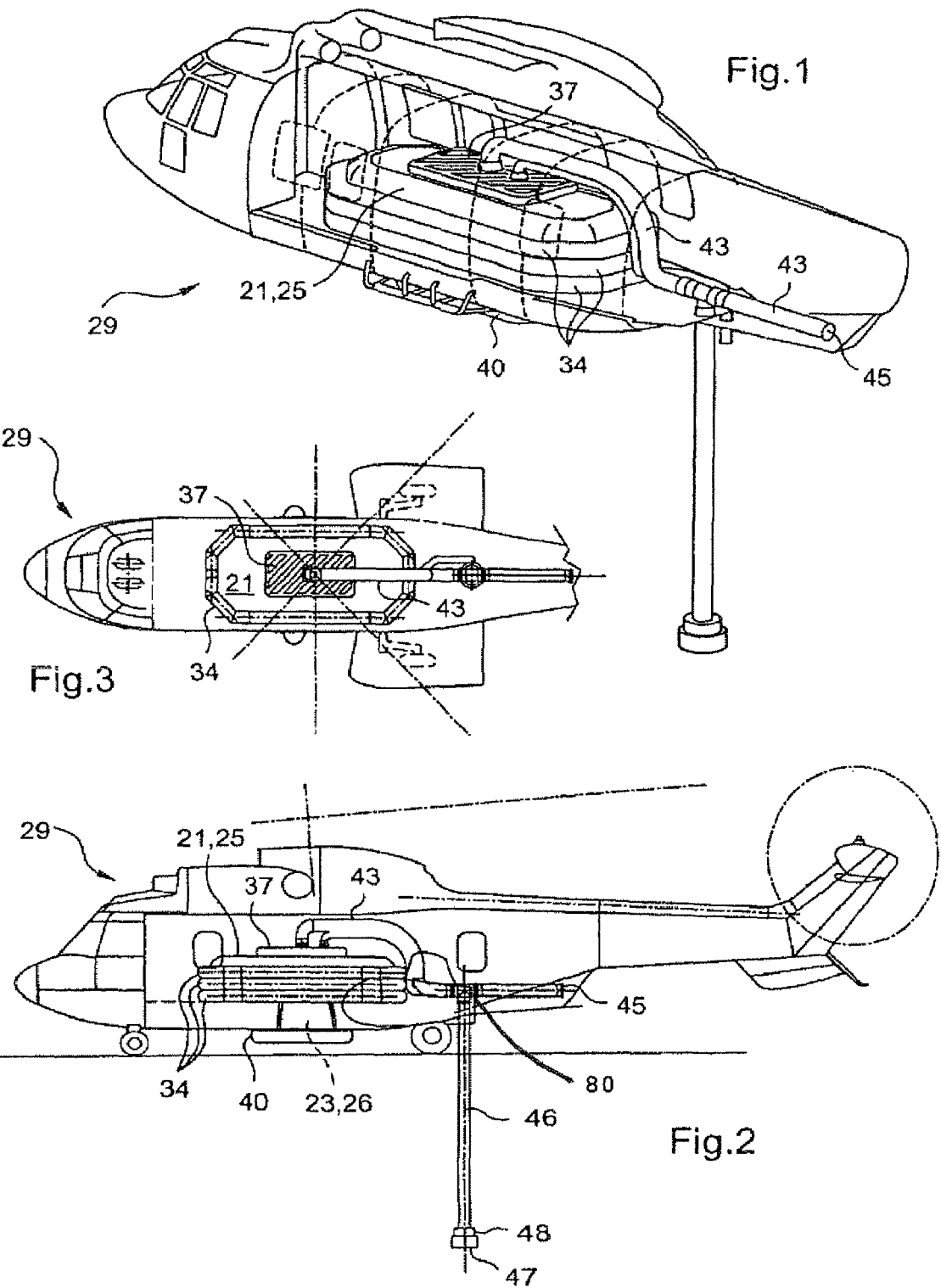

Fig. 13
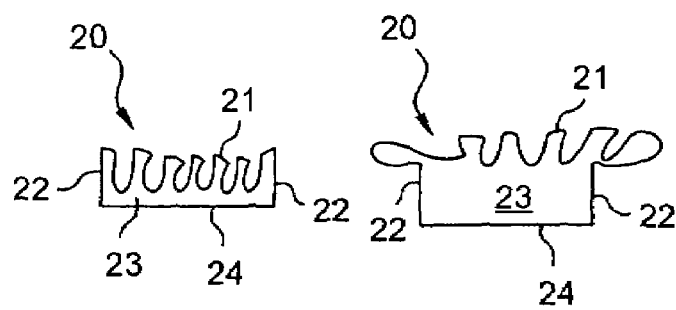
Fig. 14
Fig. 15
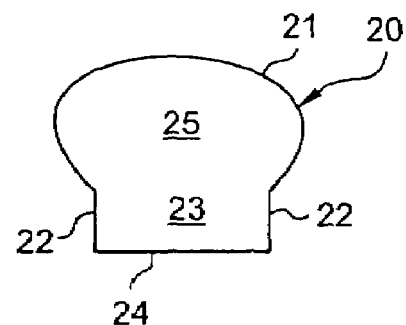
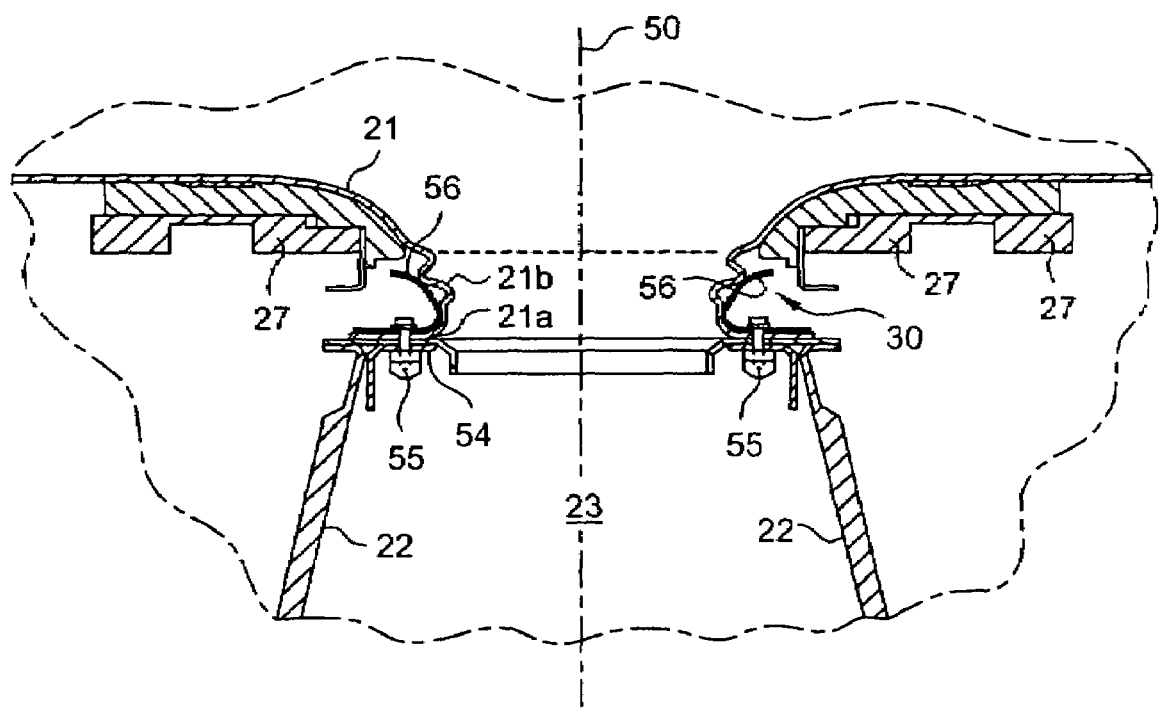
Fig. 16

AERIALLY TRANSPORTABLE TANK FOR STORING A COMPOSITION FOR DISCHARGING IN FLIGHT

The present invention relates to an aerially transportable tank for storing a composition for discharging in flight, and to a fire-fighting device incorporating such a tank.

FIELD OF THE INVENTION

The technical field of the invention is that of fabricating aerially transportable devices for fire fighting.

The present invention relates more particularly to an aerially transportable tank for storing a fluid or a powder used for fighting fires, to a device incorporating such a tank, and to an aircraft, in particular a rotorcraft, fitted with the tank and/or the device.

The present invention relates in particular to a flexible container or tank suitable for mounting on board a helicopter and designed to contain a liquid such as water for discharging in flight.

BACKGROUND OF THE INVENTION

It is known to secure a fire-fighting device under the fuselage of the helicopter, the device comprising a water storage tank fitted with hatches that can be opened to release the water stored in the tank. Such devices suffer in particular from the drawback of reducing the ground clearance of the helicopter, and of presenting storage capacity that is small.

International application WO 2005/014394 describes a helicopter fitted with tanks and a fire nozzle which are disposed inside the fuselage.

U.S. Pat. No. 3,603,506 describes a device for use in flight to spray a chemical contained in a flexible bag that can be releasably installed inside an aircraft; the bag is held in place by a net.

French patent application FR 2 829 103 describes a removable device for storing water inside the cockpit of an aircraft, comprising a flexible tank, a water discharge hatch, and actuators bearing against the tank and serving to expel the water through the hatch.

In general, it has been found that aircraft fitted with a tank in a cabin are difficult to use for any purpose other than fire fighting because of the time and expense involved in installing and removing the on-board fire-fighting system.

OBJECTS AND SUMMARY OF THE INVENTION

An object of the present invention is to propose an aerially transportable tank for storing a composition (or fluid) for discharging in flight that is improved and/or that remedies, at least in part, the shortcomings or drawbacks of prior art aerially transportable tanks.

Another object of the invention is to provide a fire-fighting device comprising such a tank, and also to provide an aircraft fitted with such a tank or such a device.

In accordance with an aspect of the invention, such a tank is provided that comprises a neck terminated by a discharge opening, and in which the wall(s) extending the neck is/are sufficiently deformable to be housed, at least in part, inside the neck.

In other words, a tank is proposed having walls that define an opening for discharging the composition stored in the tank. The tank has a first portion, or neck, that extends from the opening and that presents a first volume, together with a second portion defined by one or more walls extending the wall(s) of the first portion and presenting in a deployed configuration a second volume that is greater than the first volume, e.g. greater than three or five times the first volume. The wall(s) of the second portion associated with the first portion presents sufficient flexibility to be capable of being folded into the inside of the neck, in part or in full.

When the tank of the invention is installed on board an aircraft, the neck of the tank is disposed in a "ventral well"— or bottom well—of the aircraft, i.e. in a compartment that extends under the floor (of the cabin) and that opens out through external covers or walls of the fuselage, the tank discharge orifice extending substantially in register with these walls or covers, or indeed beneath them.

When the tank is empty and not in use, it is contained at least for the most part under the floor so that the cabin is available for its normal use. When the aircraft is used for fire fighting, the foldable portion of the tank is deployed inside the cabin and is filled with the composition for discharging in flight. After discharge, the tank can once again be collapsed under the floor of the cabin.

The neck may be constituted by, or may terminate in, a portion that diverges. The discharge opening may be fitted with a discharge mechanism having movable flaps.

The invention applies in particular to tanks having capacity situated in the range about 0.5 cubic meters ($m^3$) to about 20 $m^3$, in particular in the range about 1 $m^3$ or 2 $m^3$ to about 5 $m^3$ or 10 $m^3$.

The foldable and deployable portion or wall of the tank may be made at least in part out of a material presenting at least one layer of plastics material.

The tank may include a partition separating it into two compartments. Such a partition which is preferably leakproof can separate a main compartment communicating with the opening for discharging the stored composition from a secondary compartment that does not communicate with said opening.

The secondary compartment may be put into communication with the outside via a secondary orifice.

The secondary compartment may be designed to receive a secondary filler fluid, such as air, of density that is less than the density of the fire-fighting composition.

The secondary compartment may be arranged to cover the neck when the wall(s) defining the compartment is/are folded into the neck.

The first and second portions of the tank may form a single piece. Alternatively, these two portions may be distinct and/or separable, and the wall of the first portion or piece may then be rigid, and in particular may be made of a composite material (e.g. fiber-reinforced resin), and may be suitable for being assembled in leaktight manner to the second piece, or reservoir, by means of flanges.

The invention also provides an aerially transportable fire-fighting device comprising a tank of the invention and a deformable structure for holding the tank while it is deployed inside the cabin of an aircraft.

The holding structure may comprise filamentary links such as straps or one or more nets that are designed to connect the deformable wall of the tank to the floor or the ceiling of the cabin.

The deformable holding structure may include inclination-maintaining means for maintaining a portion of the deformable wall(s) of the tank surrounding the neck in an inclined position encouraging the stored composition to flow towards the neck.

The inclination-maintaining means may comprise an inflatable wedge-forming structure designed to extend between the cabin floor and the wall of the tank, close to the neck.

The inflatable inclination-maintaining structure may be arranged to surround all or part of the neck of the tank.

The deformable inclination-maintaining structure may include belt means that may be inflatable and that are designed to surround at least the base of the tank and to rest either directly or indirectly against the floor of the cabin.

These inflatable belt means may comprise a plurality of superposed leaktight compartments.

The invention also provides an aircraft comprising a fuselage, a cabin, fuselage walls, a cabin floor, and a ventral well or compartment extending between the cabin floor and the fuselage walls, the aircraft being fitted with a tank or device of the invention, the neck of the tank extending in the ventral well or compartment.

The aircraft may further comprise an external suction pipe fitted with a pump, an internal tank-filler pipe which connects the external suction pipe to a filler orifice provided in the deformable wall of the tank, and where appropriate an overflow pipe, also connected to the tank.

The invention enables a large quantity of water to be taken on board and it enables in-flight discharge to be optimized. The invention limits stresses when landing on unprepared ground, and facilitates rapid filling, both on the ground and when in flight. The invention makes it possible for the aircraft to continue to be used for multiple purposes, avoiding or at least limiting repercussions concerning flying qualities due to the presence of an on-board tank. The invention makes it possible to go quickly from a cabin arranged for in-flight discharge of the stored composition, to an arrangement suitable for transporting passengers and/or a variety of equipment. In both configurations, the aircraft is suitable for performing emergency winch or sling operations.

The flexible tank held in the helicopter cabin by an air-inflatable structure can store a quantity of water that is sufficient for making fire fighting more effective. Discharge takes place through a well in the structure of the helicopter and through discharge hatches. The tank empties quickly by deforming, which means that is possible to omit a venting system for connecting the tank to the atmosphere. Deflation of the structure and storage of the assembly enable the cabin to be released so as to make the aircraft available quickly for other missions.

BRIEF DESCRIPTION OF THE DRAWINGS

Other aspects, characteristics, and advantages of the invention appear in the following description which refers to the accompanying drawings and which shows preferred embodiments of the invention without any limiting character.

FIG. 1 is a cutaway diagrammatic perspective view showing a helicopter fitted with a fire-fighting device of the invention. FIGS. 7 and 9 also show respectively the characteristics of a "ventral" well and a device for wedging the tank.

FIGS. 2 and 3 are respectively a side view and a plan view showing a fire-fighting device similar to that shown in FIG. 1, mounted on board a helicopter.

FIG. 4 is a longitudinal section view, while FIGS. 5 and 6 are cross-section views, respectively on planes V-V and VI-VI, of the device shown in FIG. 4.

FIGS. 13 to 15 are simplified side views showing the structure and the operation of a tank of the invention.

FIG. 16 is a cutaway section view showing the connection between two parts making up the, tank in another embodiment of the invention.

MORE DETAILED DESCRIPTION

Figure 4:
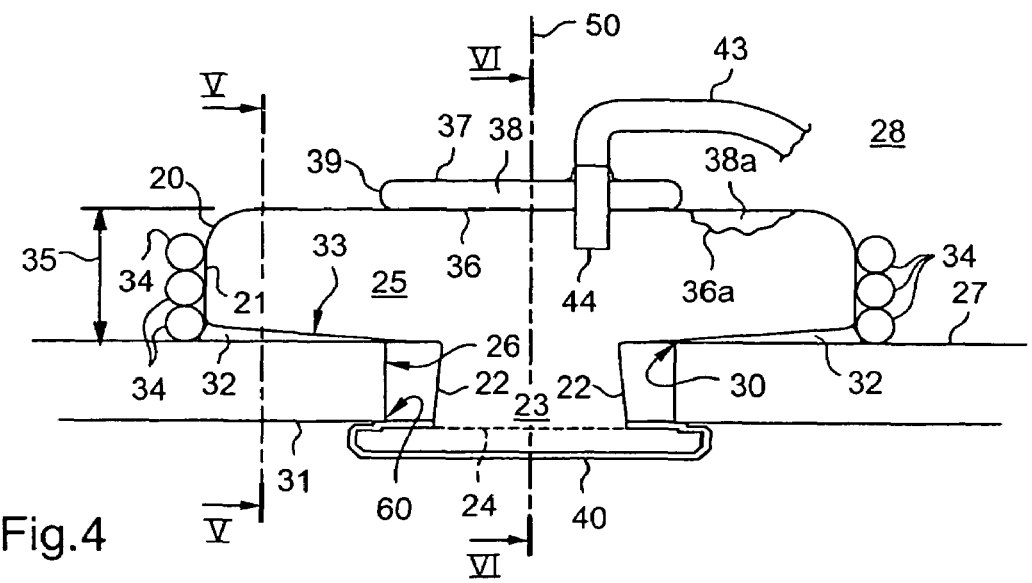
FIGS. 4 to 6 are diagrammatic section views showing a preferred embodiment of a device of the invention and how it is installed in an aircraft.

Except where specified to the contrary, identical references are used to designate elements or members that are structurally or functionally identical or equivalent (similar).

With reference to FIGS. 13 to 15, the tank 20 comprises a flexible wall 21 extending a wall 22 that may be flexible or rigid; the wall 22 defines a narrow portion 23, or "neck", of the container 20 that is terminated by a discharge opening 24. In its deployed configuration as shown in FIG. 15, the wall 21 defines a main compartment 25 which communicates with the opening 24 via the neck 23: the volume of the compartment 25 may be as much as ten times the volume of the neck 23, or even more.

In the partially-collapsed configuration shown in FIG. 14, the volume defined by the wall 21 is greatly reduced; in the folded configuration shown in FIG. 13, the wall 21 is contained within the volume 23 defined by the walls 22.

Figure 5:
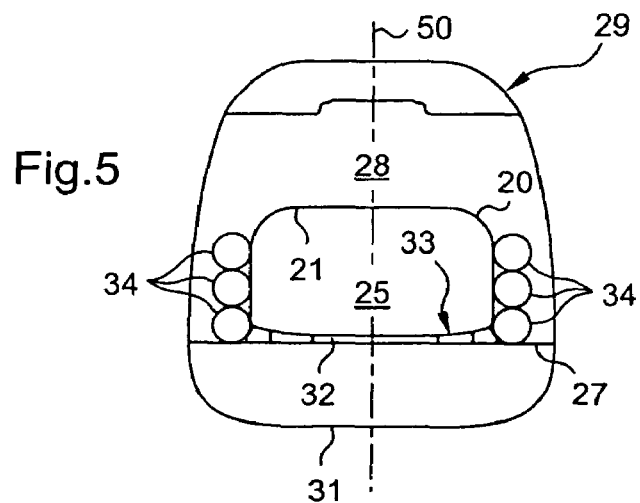
Figure 6:
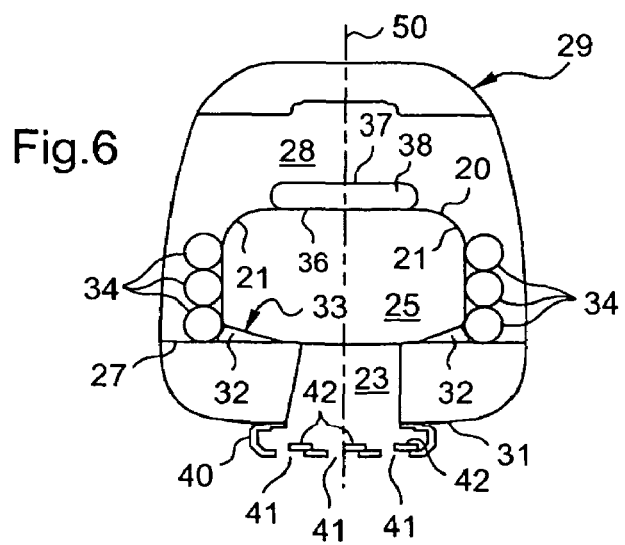
Figure 7:
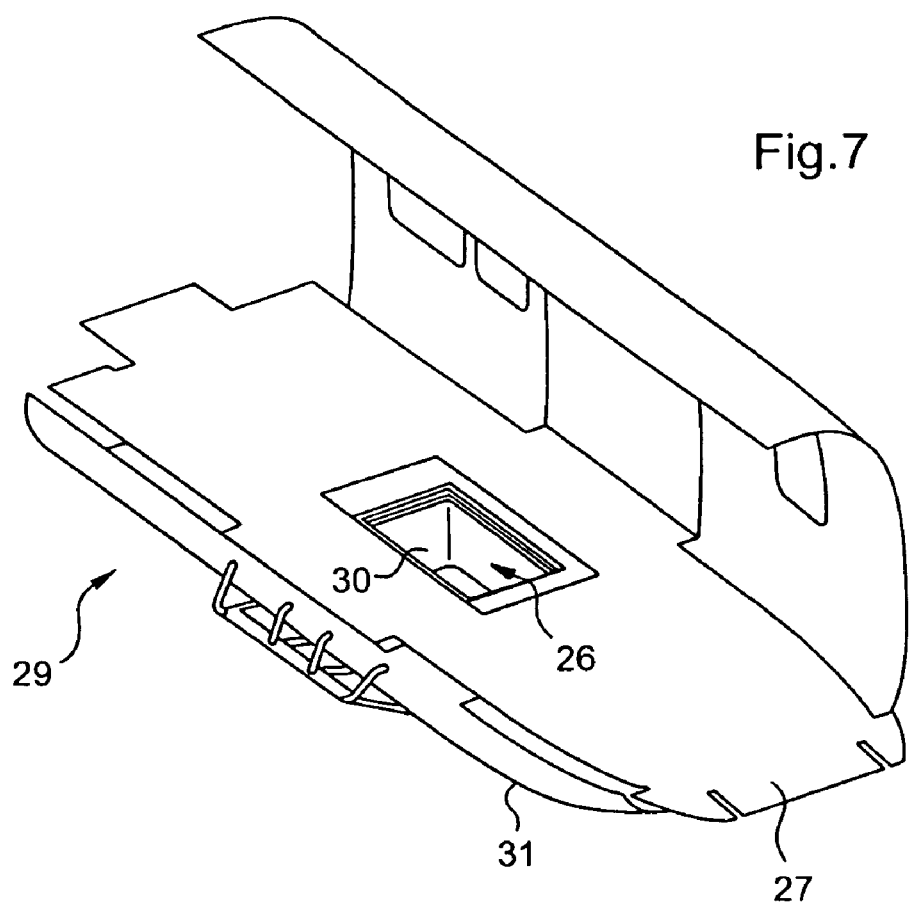
FIGS. 7 to 11 show, in similar manner and from different viewpoints, steps in mounting the device on board the helicopter.

With reference to FIGS. 4 to 6, the neck 23 of the tank 20 is inserted in a well 26 that extends vertically along an axis 50 from an opening 30 provided in the floor 27 of the cabin 28 of the aircraft 29, down to an opening 60 provided in the "ventral" portion of the fuselage 31 of the aircraft.

The flexible wall 21 rests on the floor 27 via an inflatable mattress 32 having the shape of the bottom 33 of the compartment 25. The flexible wall 21 is surrounded (see also FIGS. 1 and 3 in particular) by three superposed inflatable belts or tubes 34 which limit the extent to which the wall 21 can spread out within the cabin.

In a variant embodiment, the mattress 32 includes one or more blocks of a cellular material and/or of a plastics material foam.

These belts 34 extend over a fraction of the height 35 of the compartment 25 when the wall 21 is deployed.

The central top portion 36 of the wall defining the main compartment 25 is covered by a wall 37 co-operating with the wall 36 to define a secondary compartment 38 that is leaktight and provided with a closable opening 39. This secondary compartment can be filled with air under pressure to form a mattress that serves when the wall 21 is collapsed into the compartment 26 (in the neck 23) to close the orifice 30 and thus provide continuity for the floor 27.

At least one other compartment 38a, constituting an air-inflatable secondary compartment, may be provided in the tank 20, being separated from the main compartment 25 by a deformable leakproof partition 36a (cf. FIG. 4). This enables the working capacity of the compartment 25 to be reduced when the secondary compartment 38a is filled with air.

This makes it possible to adapt the capacity of the main tank 25 to the performance of the aircraft, which performance may be voluntarily reduced as a function of the altitude at which operations are to be performed and/or of the distance to be traveled by the aircraft between the site where the on-board tank is filled and the site where it is discharged.

A structure 40 for closing the discharge orifice 24 is connected to the mouth of the neck 23 in leaktight manner. This structure includes discharge openings 41 that can be closed by movable flaps 42 (FIG. 6) under drive from an actuator (not shown) enabling said openings to be opened or closed.

An internal suction pipe 43 has one end 44 extending inside the tank 25 for the purpose of filling it.

For this purpose, and as shown in FIGS. 1 to 3, the pipe 43 presents a coupling 45 at its rear end enabling it to be filled on the ground.

As seen in FIG. 2, a T-junction 80 is inserted between the pipe 43 and the pipe 46 so as to enable it to be connected to an external suction pipe 46 whose bottom end 47 can be used in association with a pump 48 for in-flight filling of the container with the composition that is to be discharged.

Figure 11:
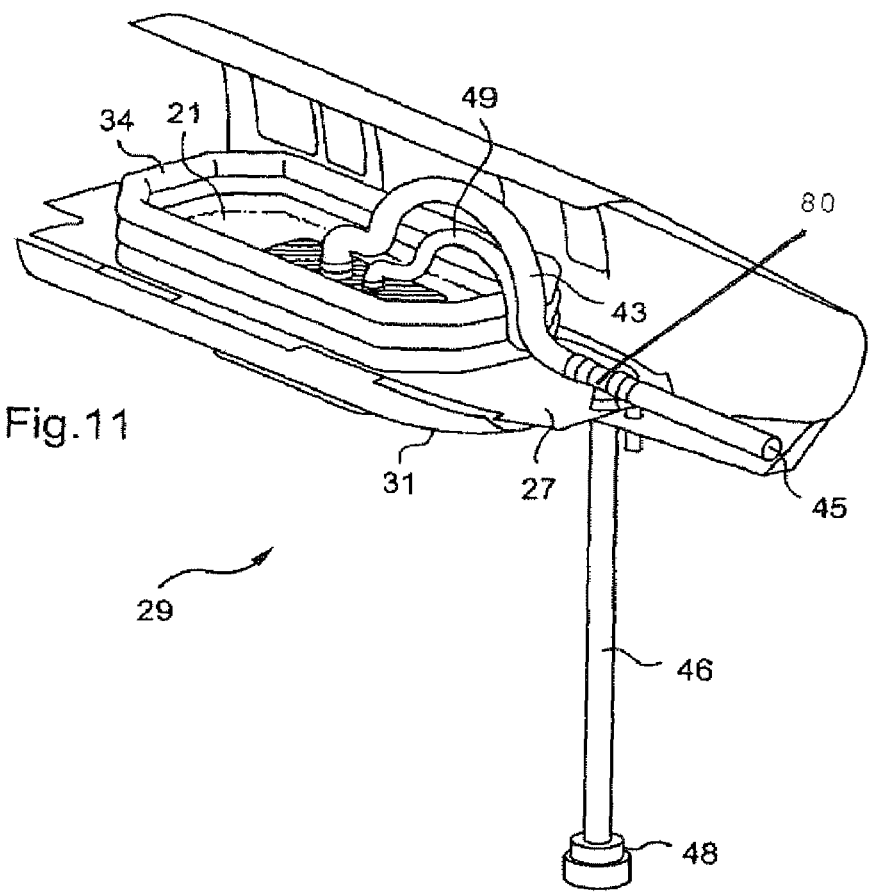

With reference to FIGS. 1 and 11 in particular, an overflow pipe 49 is also in communication with the tank 25.

With reference to FIGS. 1 to 3, 10, and 11 in particular, the device of the invention comprises a flexible tank 20 having capacity of about 4000 liters (L), for example, which is placed on the cabin floor, a discharge system (40 to 42) positioned beneath the fuselage and coupled to the tank, and a system for filling the tank 20 and connecting it to air. A smaller-capacity tank (not shown) for receiving an additive for mixing with the composition contained in the tank 20 before the resulting mixture is discharged may also be installed on board and connected to the tank 20.

The filler members including the pump 48 and the pipes 43, 46, and 49 are connected releasably to the tank and to the structure of the aircraft in order to limit ground clearance problems. When these members are separated from the tank, they can be stowed in a hold of the aircraft so as to avoid impeding access to the cabin and so as to make it easier to close the access doors to the cabin, e.g. sliding doors.

The tank 20 may be constituted essentially by a flexible reservoir of approximately rectangular block shape which is connected in leaktight manner to the discharge system. The connection between the reservoir 20 and the discharge members 40 to 42 takes place via the sleeve 22 (defining the neck 23), which can be made of a material of the same kind as that constitutes the walls 21 of the reservoir, and it may be integrated therein. This sleeve is of a shape that is adapted to match the inside shape of the ventral well 26.

The walls 36 and 37 (cf. FIG. 4) form an inflatable cushion 38 integrated in the reservoir, enabling the opening 30 formed in the floor 27 to be covered and/or closed when the tank 23, 25 is empty and folded into the well 26, and the aircraft is in use for transporting passengers or various kinds of equipment.

The cushion may be connected to the structure of the aircraft by straps that keep it parallel to the floor when the tank is filled with composition, in order to reduce the effects of the composition sloshing.

In order to further limit any deformation and/or displacement of the full tank in flight under the effect of the inertial forces that result from the mass of the composition contained in the tank and the accelerations of the aircraft, the tank may comprise a plurality of compartments that are (totally or partially) separated by one or more flexible partitions that are secured to the bag walls 21 and that may extend substantially vertically.

A connection can be provided by means of straps 51, a net 52 (FIG. 12), or any equivalent means, between the bottom and/or top portion of the tank and the carrier structure, in particular for the purpose of guiding the downward movement of the wall 36 and the folding up of the top portion of the tank while the composition it contains is being discharged.

The closing inflatable cushion can be held by straps that are anchored to the structure of the helicopter. The cushion includes one or more couplings for the pipework (not shown) for filling and/or venting and/or overflowing the compartment 38 defined thereby.

When transporting passengers or goods, it suffices to empty the tank 23, 25, to deflate the belts 34 and the mattress 32 (when the mattress is inflatable), to place the wall 21 in the neck 23, and to close or cover the openings 30 by means of the "cushion" 36 to 38.

In an emergency, it can suffice to empty the tank(s), to deflate the belts 34, and to spread the wall 21 over the floor of the cabin, said wall being designed to withstand being walked on by passengers and being protected to a large extent by the cushion 38.

As shown in FIGS. 4 to 6, and 9 to 11 in particular, the flexible tank is held in place in the cabin by an inflatable structure comprising:

a belt comprising a plurality of superposed inflatable tubes 34, e.g. made of flexible and strong PVC, and surrounding the tank; these tubes can have their outside faces bearing against structural elements of the aircraft; straps for retaining the tank on a longitudinal axis of the aircraft can be provided; when the tank is narrower than the cabin, the inflatable belt can be held in place by straps attached to the structure of the aircraft; and an inflatable floor 32 giving a "diamond point" shape to the bottom 33 of the tank 25 and enabling water to flow into the well 26 regardless of the attitude of the helicopter.

The entire reservoir-maintaining system can be deflated to make the floor of the cabin available for transporting people and/or equipment.

On installation, it is this assembly that is installed inside the well from underneath the helicopter. For reasons of space availability, the elements of the filler system may be installed in the cabin.

Figure 8:
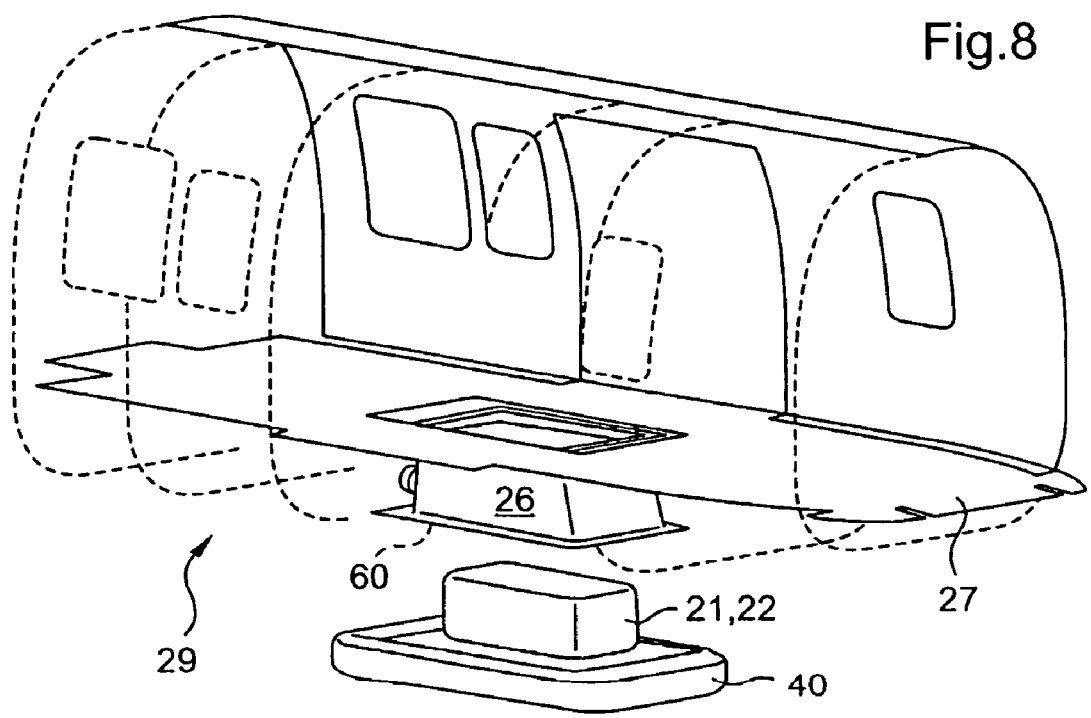
Figure 9:
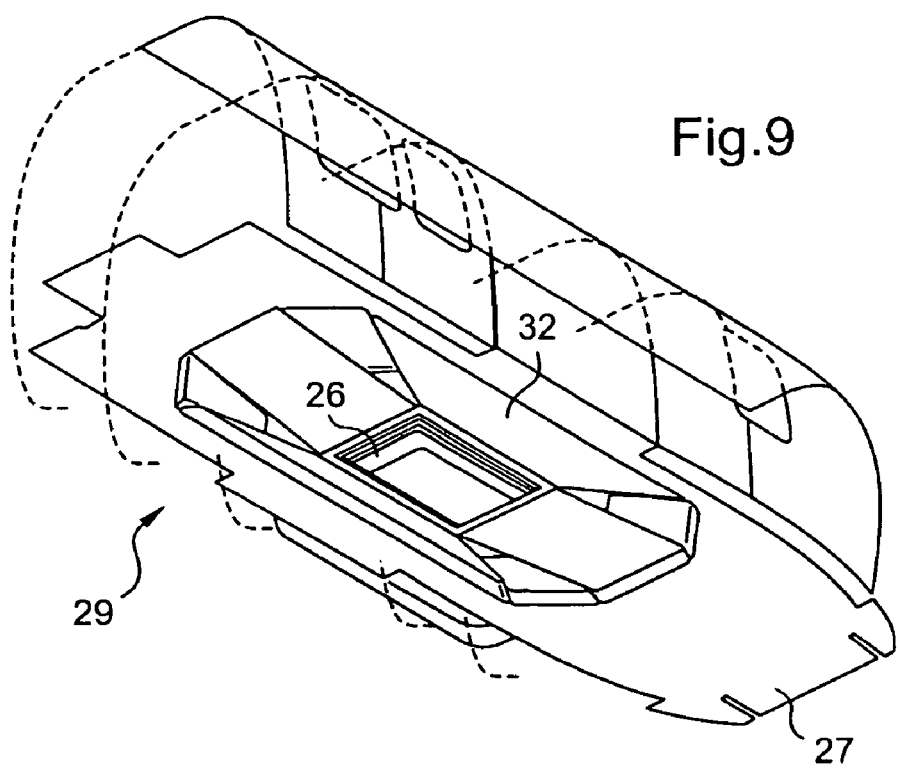
Figure 10:
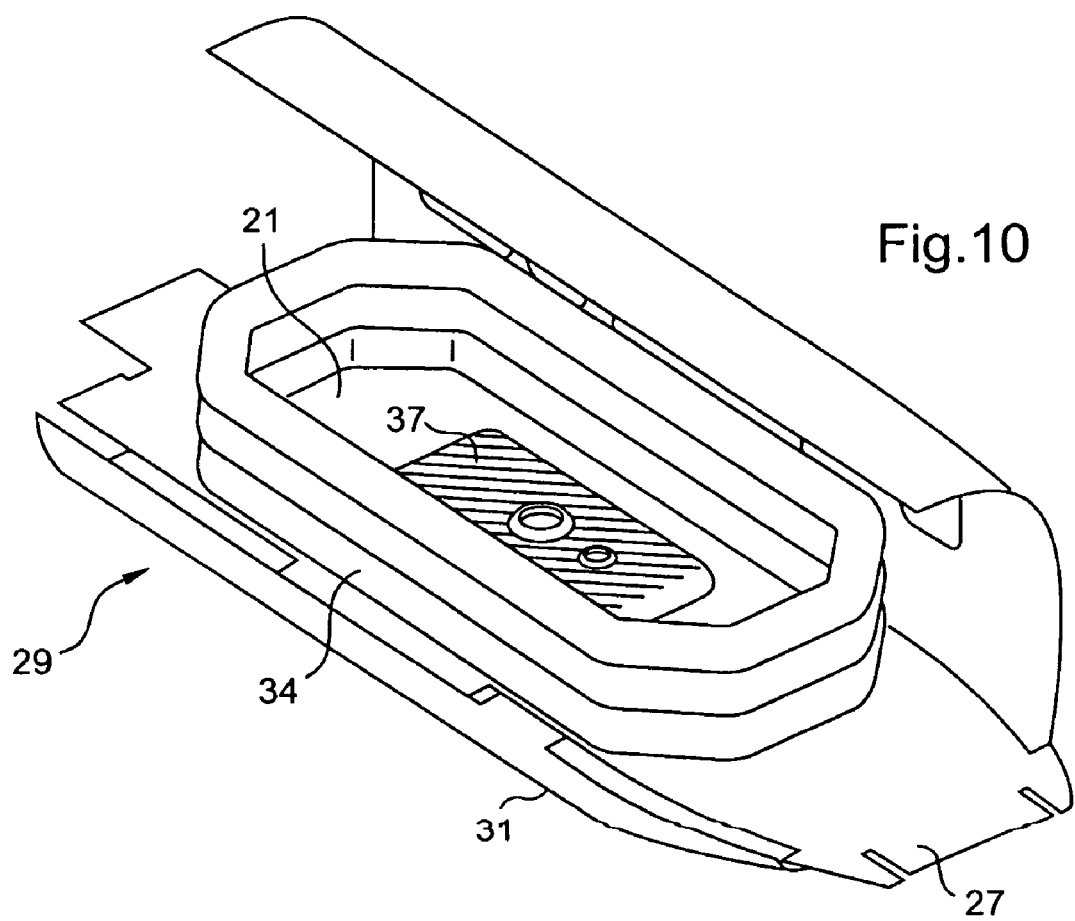

With reference to FIGS. 7 to 11 in particular, installation of the device on board a helicopter fitted with a ventral well 26 (FIG. 7) can comprise the following operations:

inserting the tank and discharge system assembly into the ventral well and fastening it to the aircraft (FIG. 8);

installing the mattress 32 for supporting the tank around the well, unfolding it, securing it, and inflating it (FIG. 9);

unfolding the walls 21, 36 of the reservoir onto the floor 27 and inflating the closure cushion (36 to 38) included in the reservoir;

unfolding, securing, and inflating the belt 34 (FIG. 10);

where appropriate, securing the reservoir to the belt 34 and to the structure of the aircraft 29; and connecting the filler, vent, and overflow pipes 43, 49 (FIG. 11) at least to the main compartment 25 of the tank.

After carrying out a mission including discharging the composition contained in the tank, deflating the belt and the floor enable the main part of the volume of the aircraft cabin to be used.

Attaching the reservoir 21 to one or more tubes 34 close to halfway up the height 35 of the deployed reservoir, makes it easier for the reservoir to fold up while the tank 25 is being emptied.

In order to convert the aircraft to a configuration for ordinary use, the filler and overflow assemblies are disconnected, the belt and the floor are folded up and stowed, the tank assembly (reservoir) is folded and stowed in the well formed in the bottom structure of the aircraft, and the well is closed by the closure floor.

Figure 12:
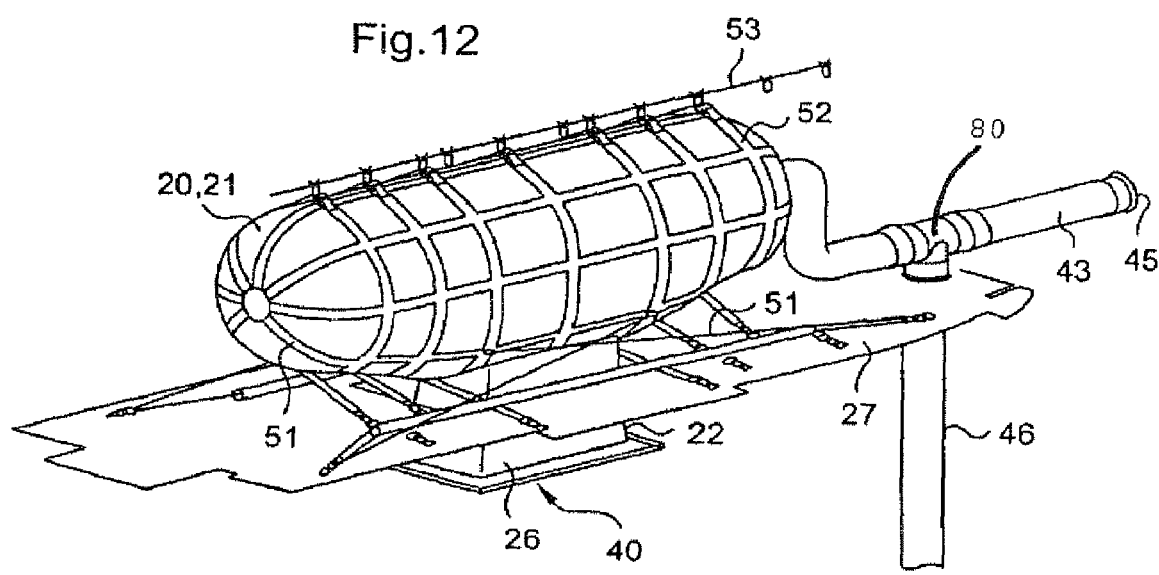
FIG. 12 is a diagrammatic perspective view of another embodiment of the invention.

In the variant shown in FIG. 12, the flexible tank is secured to a horizontal rail 53 fitted to the top of the cabin, and it is held on the cabin floor by a system of straps.

As described above, the connection between the tank and the discharge system 40 takes place in the space available in a ventral well.

The tank is held by an array of straps secured to anchor points of the structure by snap hooks, and by two pairs of straps crossing over in the bottom portion of the tank.

With reference to FIG. 16, the tank has a rigid wall 22 secured to the structure of the aircraft and presenting a substantially frustoconical shape about an axis 50 that flares downwards. This wall is fitted at its top with a flange 54 pierced by orifices for passing bolts 55. The flexible wall 21 of the tank is terminated by a bellows 21b and a collar 21a. The collar extends between the flange 54 and a backing flange 56 also pierced by orifices for passing bolts 55. The bolts are tightened so as to provide a leaktight connection between the walls 21 and 22.

Naturally, various additions, omissions, or modifications could be implemented by the person skilled in the art to the various embodiments described above, both concerning structural elements and functional components, without thereby going beyond the ambit of the present invention.

What is claimed is:

1. A tank (20) for storing a fluid composition and for discharging the stored fluid composition in flight, the tank comprising:
    a configuration releasably installable inside a fuselage of an aircraft,
    when installed inside the fuselage of an aircraft, the tank having i) a collapsed-folded position and ii) an unfolded position,
    from bottom to top, the configuration comprising
    i) a lower rigid discharge opening,
    ii) movable flaps located within said discharge opening and having a first position closing said discharge opening to fluid discharge and a second position opening said discharge opening, the second position operative for discharging the fluid composition during flight from the tank via said discharge opening,
    iii) a lower neck connected to and above said discharge opening, said lower neck configured for installation in a ventral portion of the fuselage through an upper opening within a cabin floor inside a cabin of the fuselage, said lower neck defining a main compartment of a first volume for collapsing through the upper opening,
    iv) a flexible wall with a wall portion protruding under the cabin floor, wherein the flexible wall a) in the unfolded position of the tank, extends upward from said lower neck inside the fuselage and forms a secondary compartment of a second volume for storing the fluid composition to be discharged, and b) in the collapsed-folded position, is folded inside said first volume within the lower neck,
    v) a plurality of superposed inflatable belts that, in the unfolded position of the tank, extend inside the fuselage, said belts being outside and around said flexible wall and supporting upright said flexible wall in the unfolded position, upon at least a part of a height vertical dimension of said secondary compartment,
    vi) a central top wall integral with the flexible wall, and, in the collapsed-folded position of the tank, forming a mattress closing the upper opening within the cabin floor and in collapsed-folded position of the tank also providing continuity for the cabin floor inside the fuselage, and
    vii) an internal suction pipe located within said central top wall, said internal suction pipe configured for introduction of the fluid composition into the tank.

2. The tank according to claim 1, wherein the second volume is greater than the first volume.

3. The tank according to claim 2, wherein the flexible wall is separable from the neck and the neck and wall are connected via a flange.

4. The tank according to claim 1, wherein a capacity of the tank is in the range of about $0.5m^3$ to about $20m^3$, and the flexible wall includes a material having at least one layer of plastics material.

5. The tank according to claim 1, further comprising a partition separating the main and secondary compartments.

6. The tank according to claim 1, further comprising a leaktight partition that separates the main compartment from the secondary compartment, wherein the secondary compartment does not communicate with said discharge opening.

7. The tank according to claim 6, wherein the secondary compartment includes a secondary orifice and the secondary compartment communicates outside the tank via the secondary orifice.

8. The tank according to claim 6, wherein the secondary compartment receives a secondary composition having a density less than a density of the fluid composition for discharging in flight.

9. The tank according to claim 8, wherein the secondary composition is air.

10. The tank according to claim 6, wherein the secondary compartment covers the neck when the main compartment is housed inside the neck.

11. The tank according to claim 1, wherein the aircraft is a rotorcraft,
    the tank further comprising a holding structure running along the cabin floor and, in the unfolded position of the tank, holding a generally horizontal portion of the flexible wall inside the cabin.

12. The tank according to claim 11, wherein the holding structure includes an inclination-maintaining structure that supports the generally horizontal portion of the flexible wall in an inclined position such that any stored fluid composition flows towards the neck.

13. The tank according to claim 12, wherein the inclination-maintaining structure comprises a wedge-forming structure that extends between the floor of the cabin and the wall of the tank, adjacent to the neck.

14. The tank according to claim 12, wherein the inclination-maintaining structure is inflatable at least in part and surrounds at least a portion of the neck of the tank.

15. The tank according to claim 12, wherein the inclination-maintaining structure includes one or more blocks of cellular material.

16. The tank according to claim 11, wherein the holding structure further includes a belt that surrounds at least a portion of the tank, wherein the belt rest on the floor of the cabin.

17. The tank according to claim 16, wherein the belt are inflatable and comprise a plurality of superposed leaktight compartments.

18. The tank according according to claim 11, wherein the tank further includes an inflatable secondary compartment that covers the neck and the opening in the floor of the cabin when the wall is housed inside the neck.

19. A rotorcraft in combination with the tank of claim 1 releasably installed therein.

20. The rotorcraft according to claim 19, further comprising an external suction pipe fitted with a pump, an internal tank-filler pipe connecting the external suction pipe to a filler orifice provided in a deformable wall of the tank, and an overflow pipe that connects to the tank.

* * * * *